UNITED STATES PATENT OFFICE.

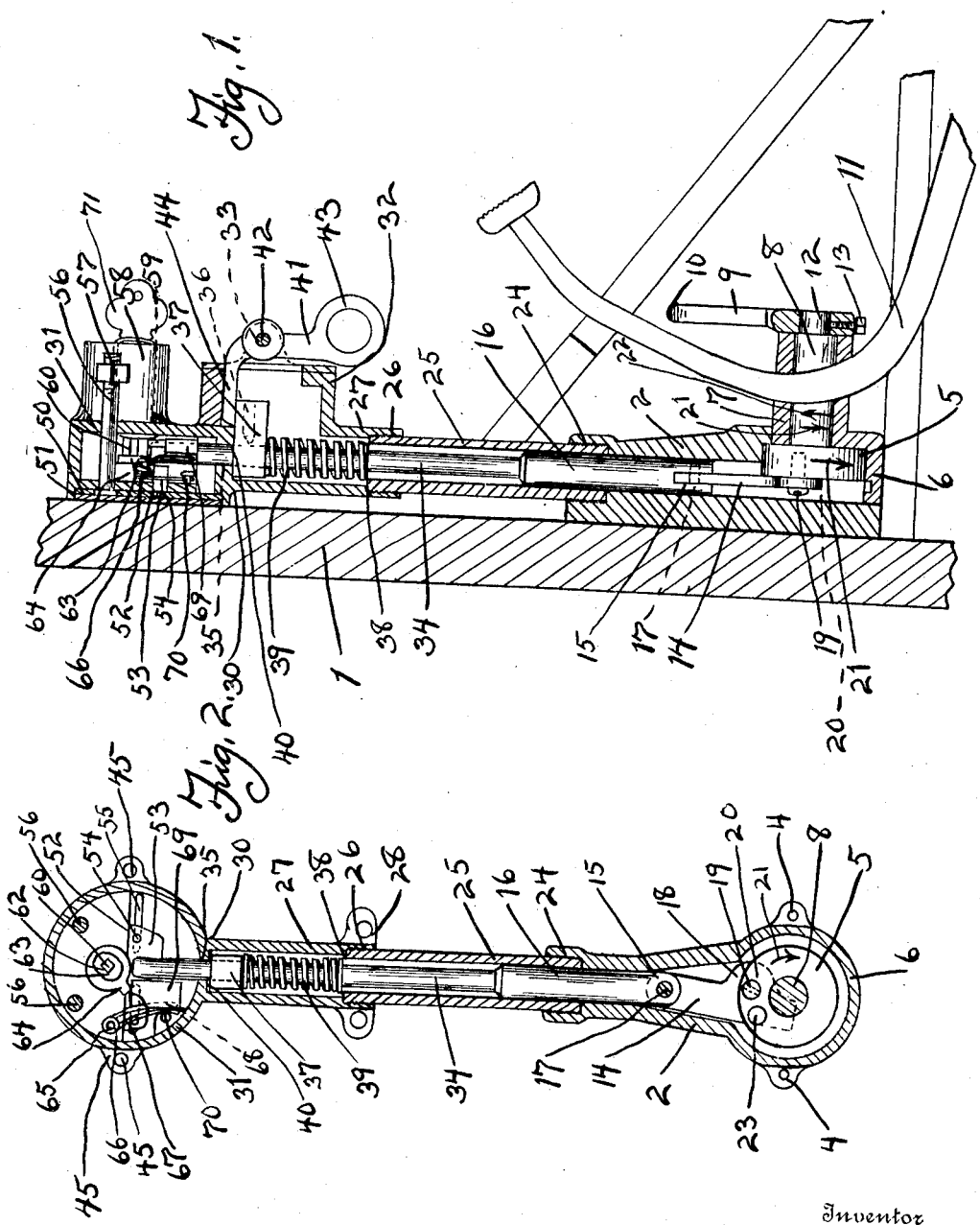
G. P. SMITH.
LOCK FOR AUTOMOBILE CLUTCH LEVERS.
APPLICATION FILED JULY 3, 1913.
1,084,237.
Patented Jan. 13, 1914.
3 SHEETS—SHEET 1.
Inventor
Geo. P. Smith

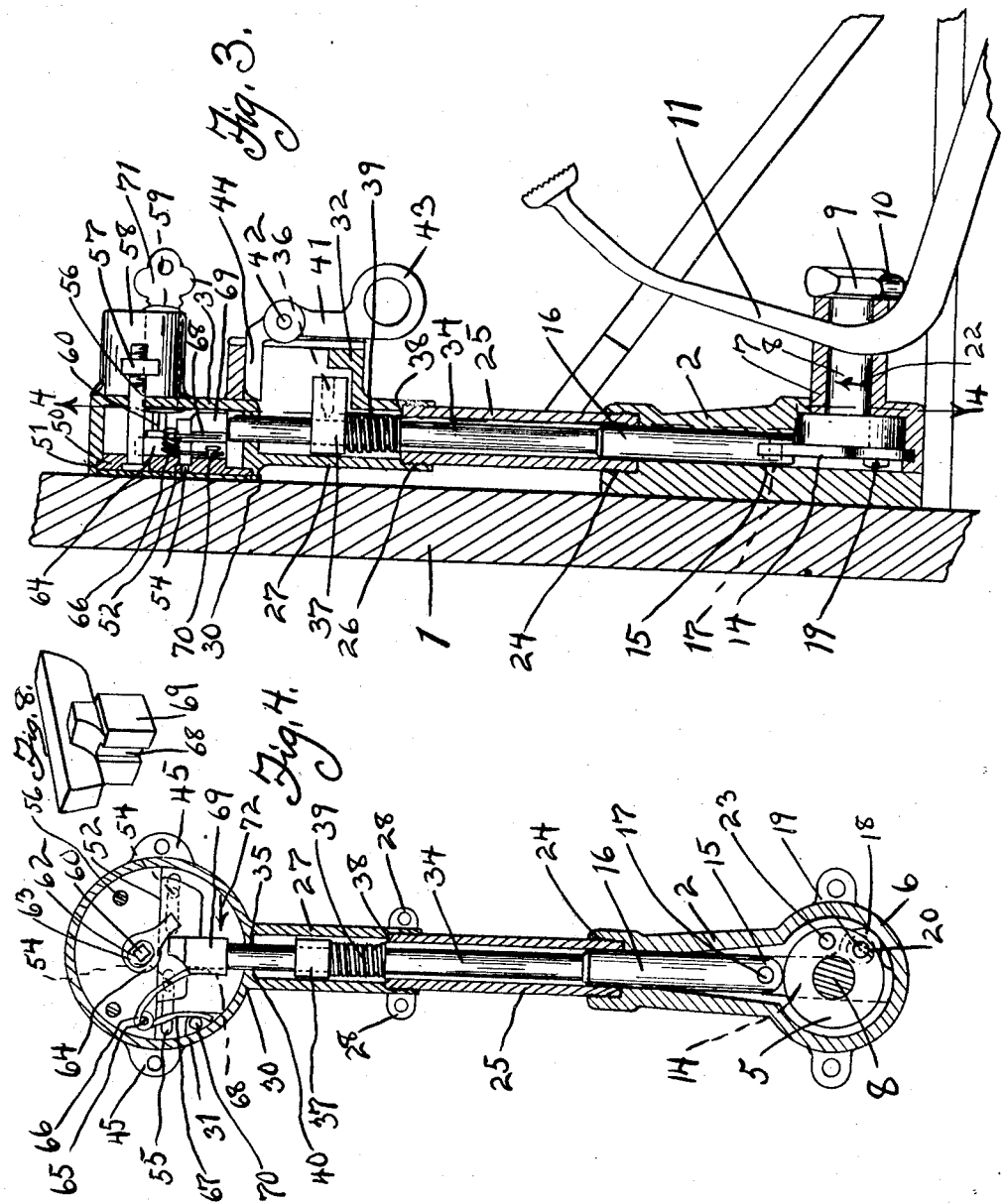

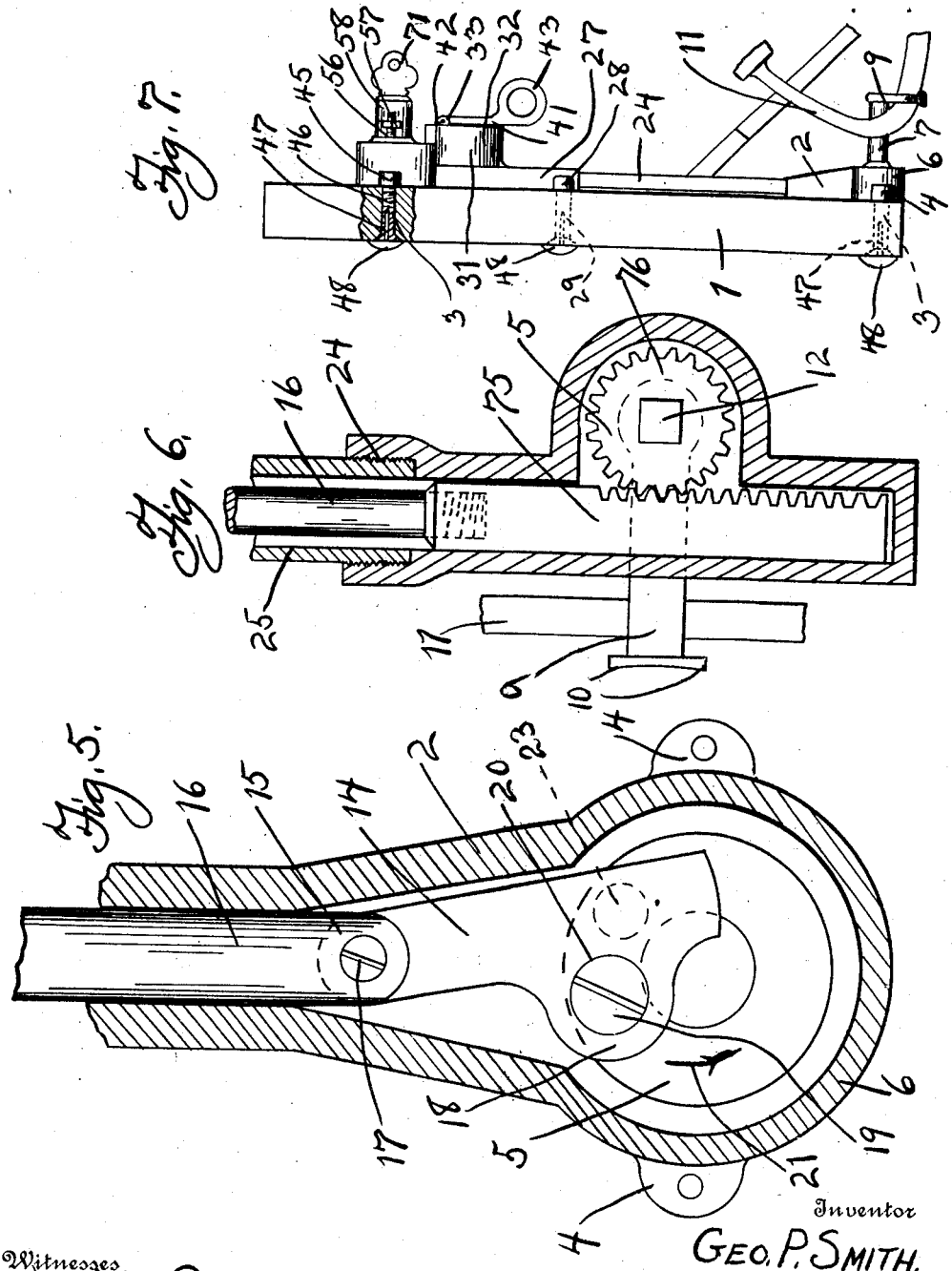

GEORGE P. SMITH, OF ST. LOUIS, MISSOURI.

LOCK FOR AUTOMOBILE CLUTCH-LEVERS.

1,084,237.  Specification of Letters Patent.  Patented Jan. 13, 1914.

Application filed July 3, 1913. Serial No. 777,279.

*To all whom it may concern:*

Be it known that I, GEORGE P. SMITH, a citizen of the United States, residing at St. Louis, in the State of Missouri, have invented a new and useful Lock for Automobile Clutch-Levers; and I do hereby declare the following to be a full, clear, and exact description of the invention, such as will enable others skilled in the art to which it appertains to make and use the same.

This invention relates to a new and useful lock mechanism for automobile clutch levers.

An object of the invention is to provide a mechanism of this nature for securely locking such clutch levers, so as to prevent machines from being operated, other than by an authorized party.

Another object of the invention is to simplify, improve, and render more practical the locking mechanism, set forth, shown and claimed in the application, filed Dec. 23, 1912, Serial No. 738,262, allowed May 22, 1913, and the application filed October 10, 1912, Serial No. 724,995, which has matured into Patent No. 1,066,539.

Another object of the invention is the provision of a rocking member having an arm, said rocking member adapted to be operated, so as to throw the arm in the path of the clutch lever, whereby the same may be locked in one or more positions.

One of the features of the invention is to construct and arrange the rocking member in such wise as to permit the same to be rocked in a reverse direction.

Another feature of the invention is the provision of improved means for operating and locking the rocking member.

In practical fields it may be found necessary to subject the minor details of construction to alterations, to which the patentee is entitled, provided the alterations fall within the scope of what is claimed.

The invention comprises further features and combination of parts, as hereinafter set forth, shown in the drawings and claimed.

In the drawings:—Figure 1 is a view in section of a portion of a dash board of an automobile, showing the lock mechanism as applied thereto. Fig. 2 is a sectional view on line 2—2 of Fig. 1. Fig. 3 is a view similar to Fig. 1, showing the clutch lever locked. Fig. 4 is a view similar to Fig. 2 on line 4—4 of Fig. 3 showing the clutch lever locked. Fig. 5 is a detail view of the lower portion of the locking mechanism, showing the link connection between the plunger and a disk of the partial rocking member reversed, so that the rocking member may be rocked in a reverse direction. Fig. 6 is a detail view showing a different connection between the rocking member and the plunger. Fig. 7 is a side elevation showing the locking mechanism applied to a dash board. Fig. 8 is a detail view of the plate bolt 53.

Referring more particularly to the drawings, 1 designates a portion of the dash board of an automobile, to which a casing 2 is secured, by means of the screws, bolts or the like 3, which penetrate the ears 4. The lower portion of the casing 2 is annular, as shown and mounted or arranged therein is a disk 5. Forming a portion of this annular portion 6 of the casing 2 is a cylindrical casing 7, projecting laterally thereof and arranged concentric thereto. Mounted to rock in the cylindrical casing 7 is a rocking member or stub shaft 8, which is carried by the disk 5. Riveted upon the rocking member 8 is an arm 9, which is provided with lateral projections 10, which when the arm 9 is in the path of the automobile clutch lever 11, assist in preventing displacement of the clutch lever. The rocking member 8 has a reduced extension 12, to which the arm 9 is secured by means of a set screw 13, to prevent the disconnection of the arm. The casing 2 tapers upwardly from the annular portion 6, and the interior of the casing 2 is correspondingly tapered, so as to permit of the reception of the link 14. The upper end of this link 14 is pivotally connected in the bifurcation 15 of the plunger 16, by means of the pin 17. The lower end of the link 14 has an offset ear 18, for the reception of the screw bolt 19, which is threaded into an aperture 20 of the disk 5. It will be seen that as the plunger 16 is moved downwardly, the disk 5 will be partially rotated in the direction of the arrow 21, thereby likewise rocking the member 8, so as to throw the arm in the path of the automobile clutch lever.. However, the member 8 may be rocked in the reverse direction as indicated by the arrow 22, by reversing the position of the link 14 and connecting the screw 19 in the aperture 23, as shown in Fig. 5.

The upper portion of the casing 2 is cylindrical, and is threaded as at 24 to the tube 25, which in turn is threaded at 26 into the cylindrical casing 27. This cylindrical casing 27 is provided with ears 28, through which the machine screws 29 extend, for fastening the casing 27 to the dash board. The upper end of the casing 27 connects in any suitable manner as at 30 to the annular casing 31, and as shown in Fig. 1 of the drawings the casing 27 is provided with a laterally extending casing 32 having ears 33. The plunger rod 16 where it passes through the cylindrical portion of the casing 2 is of such a diameter as to fit neatly therein, while the upper portion of the plunger rod is reduced in diameter, the reduced portion 34 neatly fitting an opening 35 in the annular casing 31. Secured by means of a set screw 36 to the reduced portion 34 of the rod is an arm 37, which extends into the laterally extending casing 32.

Surrounding the reduced portion of the plunger rod, and interposed between the arm 37 and the flange 38 is a spring 39, the expansive action of which tends to hold the plunger rod upwardly as shown in Figs. 1 and 2, with the arm 37 against the shoulder 40.

Pivoted between the ears 33 of the casing 32 is a latch lever 41, the pivot of which is denoted by the numeral 42. This lever 41 has a ring portion 43, to receive the finger of the operator or chauffeur, whereby the latch lever 41 may be swung slightly upwardly, thereby causing the arm 44 thereof to contact with the arm 37, so as to impart a downward movement to the plunger rod 16, which in turn will partially rotate the disk 5 and rock the member 8.

The annular casing 31 is provided with ears 45 for the reception of the machine screws 46, which penetrate the dash board. The machine screws 3, 29 and 46, as shown in Fig. 7 are drilled as shown at 47 to receive the brass headed nails or tacks 48, which not only assist in preventing the screws from being removed owing to the prevention of the use of the screw driver, but also lend a neat appearance to the front face of the dash board.

The annular casing is provided with a plate 50 seated against a shoulder 51 of the annular wall of the casing 31. This plate 50 is constructed with a shoulder 52, which acts as a guide for the shiftable plate bolt 53, the pins 54 of which enter the slots 55, in order to also assist in guiding the plate bolt, when the same is shifted. Passing through the plate 50 are screw bolts 56, which are threaded into the ears 57 of the key barrel 58, for securing the barrel in place. The cylinder 59 of the key barrel has an extension 60 which is rectangular in cross section, to fit a correspondingly shaped opening 62 of the tumbler 63, which is constructed with a lug 64. The plate 50 is provided with a lug 65, on which the coils 66 of the spring 67 are mounted. One arm of the spring bears in a groove 68 of a lateral portion 69 of the plate bolt, while the other arm of the spring bears against the lug 70. The tendency of the spring is to hold to plate bolt in the path of the plunger 16, that is, when the plunger is down, thereby holding the plunger rod 16. To unlock the plunger rod reference being had to Figs. 3 and 4, the key 71 is inserted in the cylinder 59, and by imparting a partial revoluble movement to the cylinder, thereby likewise causing the extension 60 to partially rotate, and owing to the tumbler being carried by the extension, the lug 64 will be brought in contact with the lateral portion 69 of the plate bolt, thereby shifting the same in the direction of the arrow 72 from the path of the plunger rod, then the plunger rod is free to move upwardly, owing to the expansive action of the spring 39. As the plunger rod 16 moves upwardly, the disk 5 is returned to its normal position, with the arm 9 out of the path of the automobile clutch lever. However, when the plunger rod 16 is forced downwardly by operating the latch lever 41, the plate bolt will move automatically into the path of the plunger rod, owing to the action of the spring 67.

In Fig. 6 it will be seen that the plunger rod 16 at the lower end terminates in a rack 75 adapted to engage a pinion 76 of the partially revoluble device or member 8, for rotating the same. By reversing the position of the casing 2, with the pinion upon the other side and the rack and plunger rod likewise reversed, the device or member 8 may be reversed in its movement.

The invention having been set forth, what is claimed as new and useful is:—

1. In combination with a member to be locked, a casing to be secured to a stationary part, a partially revoluble device including a disk in said casing, a plunger rod having a link connection with said disk, means for manually operating the rod downwardly to partially rotate said device, an arm on said device which assumes a position in the path of said member when said device is partially revolved, automatically actuated means to assume a position in the path of the plunger rod to lock the same, and means for unlocking the automatically actuated means, and means for returning said plunger rod to its normal position when said automatically actuated means is unlocked.

2. In combination with a member to be locked, a casing to be secured to a stationary part, a partially revoluble device including a disk in said casing and provided with an arm to be thrown in the path of said member to lock the same, a plunger rod having a link connection with said disk, a manually operated element for depressing the plunger rod for partially rotating said device, a spring tensioned plate bolt adapted to automatically assume a position in the path of the plunger rod when the same is depressed, a mechanism to throw said plate bolt from the path of said plunger rod to unlock the same, and means for automatically returning said plunger rod to its normal position, said link connection being so arranged and constructed as to adapt the same to be reversed, whereby said partially revoluble device may be reversed in its movement.

3. In combination with a member to be locked, a casing adapted to be secured to a stationary part, a partially revoluble disk having a stub shaft, an arm adjustably secured on one end of said shaft and adapted to be thrown in the path of said member, means adapted to be depressed and having a link connection with said disk for operating the same, a mechanism for operating said means whereby said arm may be thrown in the path of said member, and an automatically actuated mechanism for locking said means.

4. In combination with a member to be locked, a casing adapted to be secured to a stationary part, a partially revoluble disk having a stub shaft, an arm adjustably secured on one end of said shaft and adapted to be thrown in the path of said member, means adapted to be depressed and having a link connection with said disk for operating the same, a mechanism for operating said means whereby said arm may be thrown in the path of said member, an automatically actuated mechanism including a spring-tensioned element to assume a position in the path of said means for locking the same, a part of said casing including a shoulder for guiding said element.

5. In combination with a member to be locked, a casing adapted to be secured to a stationary part, a partially revoluble disk having a stub shaft, an arm adjustably secured on one end of said shaft and adapted to be thrown in the path of said member, means adapted to be depressed and having a link connection with said disk for operating the same, a mechanism for operating said means whereby said arm may be thrown in the path of said member, an automatically actuated mechanism including a spring-tensioned element to assume a position in the path of said means for locking the same, a part of said casing including a shoulder for guiding said element, and means for throwing said element from the path of the first means.

In testimony whereof I have signed my name to this specification in the presence of two subscribing witnesses.

GEORGE P. SMITH.

Witnesses:
 FLORA FRICKE,
 JOHN A. FRITZ.